United States Patent [19]
Headley

[11] Patent Number: 5,775,308
[45] Date of Patent: Jul. 7, 1998

[54] INTERNAL COMBUSTION ENGINE

[76] Inventor: Ronald George Alfonso Headley, 94c The Broadway, Norton Stourbridge, West Midlands DY8 3HM, United Kingdom

[21] Appl. No.: 693,125
[22] PCT Filed: Feb. 13, 1995
[86] PCT No.: PCT/GB95/00298
  § 371 Date: Aug. 9, 1996
  § 102(e) Date: Aug. 9, 1996
[87] PCT Pub. No.: WO95/21997
  PCT Pub. Date: Aug. 17, 1995

[30] Foreign Application Priority Data

Feb. 11, 1994 [GB] United Kingdom ............ 9402631

[51] Int. Cl.⁶ ............................................. F01M 31/12
[52] U.S. Cl. ........................................ 123/549; 128/575
[58] Field of Search .......................... 123/549, 543, 123/548, 546, 547, 575, 557, 552, 1 A, 127

[56] References Cited

U.S. PATENT DOCUMENTS

| | | | |
|---|---|---|---|
| 2,030,745 | 2/1936 | Coffey | 123/575 |
| 4,068,639 | 1/1978 | Cook | 123/127 |
| 4,092,962 | 6/1978 | Beaton et al. | |
| 4,092,963 | 6/1978 | Vrooman | 123/549 |
| 4,157,700 | 6/1979 | Conner | 127/557 |
| 4,368,163 | 1/1983 | Covey, Jr. | |
| 4,395,998 | 8/1983 | Chou | 123/575 |
| 4,409,946 | 10/1983 | Sandford et al. | 123/557 |
| 4,454,841 | 6/1984 | Reinhard et al. | 123/557 |
| 4,519,341 | 5/1985 | McGarr | 123/1 A |
| 4,572,133 | 2/1986 | Bago | 123/557 |
| 5,140,966 | 8/1992 | Wong | 123/543 |

FOREIGN PATENT DOCUMENTS

| | | | |
|---|---|---|---|
| 0 154 975 | 9/1985 | European Pat. Off. | F02B 47/02 |
| 2 472 090 | 6/1981 | France | F02M 31/18 |
| 28 26 976 | 1/1980 | Germany | F23D 11/44 |
| 37 25 561 | 2/1989 | Germany | F02M 31/18 |
| 2 078 297 | 1/1982 | United Kingdom | F02M 25/00 |
| 2169654 | 7/1986 | United Kingdom | |
| 2 263 310 | 7/1993 | United Kingdom | F02M 31/18 |
| WO 92/05360 | 4/1992 | WIPO | F02M 31/18 |

*Primary Examiner*—Marguerite McMahon
*Attorney, Agent, or Firm*—Fulwider Patton Lee & Utecht, LLP

[57] ABSTRACT

An engine e.g. an internal combustion engine (10) comprises at least one combustion chamber (11–14) in which fuel and air are ignited to produce power, and delivery means (19,16) to deliver the primary fuel to the combustion chamber (11–14), air delivery means (15–17) to provide air to the combustion chamber (11–14) and including a delivery duct (15) through which the air flows prior to entering the combustion chamber (11–14), an apparatus (25) to provide a secondary fuel to the combustion chamber, the secondary fuel being different from the primary fuel, the apparatus (25) comprising a housing (26) having therein:

a) a chamber (30) in which the secondary fuel is stored in liquid state, and, b) a heating device (35) into which liquid fuel may flow from the chamber (30), the heating device (35) being adapted to heat the secondary fuel sufficiently to cause at least vaporisation and preferably cracking thereof, and the housing (26) having outlet means (46) from which the secondary fuel can pass in vapour state and there being passage means along which the secondary fuel flows towards the combustion chamber (11–14).

15 Claims, 4 Drawing Sheets

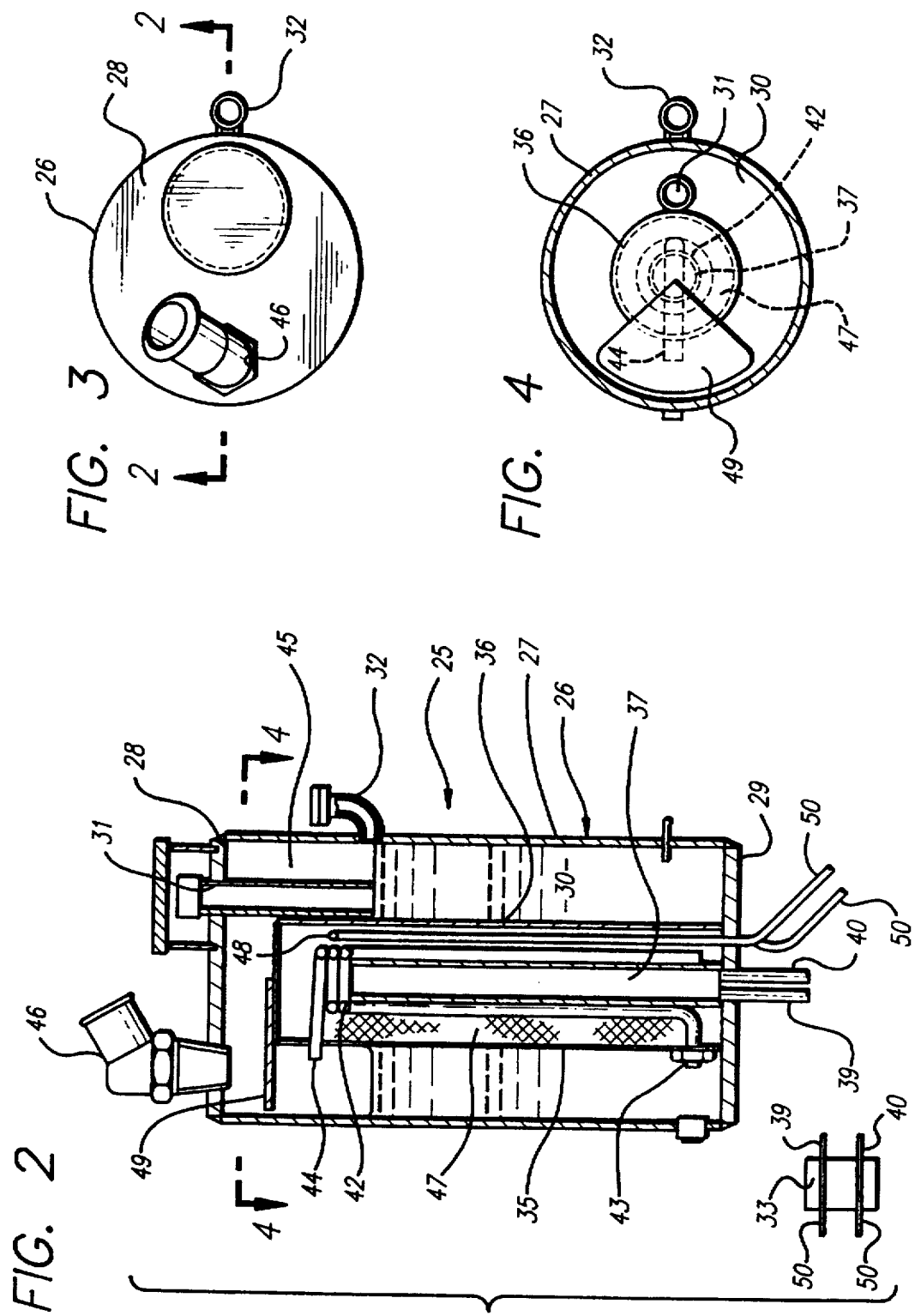

INTERNAL COMBUSTION ENGINE

Description of Invention

This invention relates to an engine and more particularly, but not exclusively, to an internal combustion engine for a vehicle such as a motor car or lorry, although the invention may be applied to a static kind of internal combustion engine or another kind of engine if desired.

In GB Patent 2169654 there is disclosed an internal combustion engine in which a secondary fuel comprising mineral oil is vaporised and fed to the engine to improve the efficiency of combustion within the engine. The apparatus described comprises a tank which contains the mineral oil, and a separate heating device to which the secondary fuel flows under gravity or is pumped, and a trap where the vaporised mineral oil is retained until it is fed to the internal combustion engine.

It has been found that such a construction presents problems due to the space taken up by the tank and separate heating device, as well as the time taken to convert a conventional internal combustion engine to utilise the secondary fuel.

According to one aspect of the invention we provide an engine comprising at least one combustion chamber in which fuel and air are ignited to produce power, delivery means to deliver the primary fuel to the combustion chamber, air delivery means to provide air to the combustion chamber and including delivery duct means through which the air flows prior to entering the combustion chamber, an apparatus to provide a secondary fuel to the combustion chamber, the secondary fuel being different from the primary fuel, characterised in that the apparatus which provides the secondary fuel to the combustion chamber comprises a housing having therein:

(a) a chamber in which the secondary fuel is stored in liquid state, and, (b) a heating device into which liquid fuel may flow from the chamber, the heating device being adapted to heat the secondary fuel sufficiently to cause at least vaporisation thereof, and the housing having outlet means from which the secondary fuel can pass in vapour state and there being passage means along which the secondary fuel flows towards the combustion chamber.

It has been found that an arrangement in accordance with the invention overcomes the technical and commercial problems with the prior art arrangements exemplified above.

The secondary fuel is preferably fed into the duct means through which the combustion air passes prior to entering the combustion chamber such that the combustion air and secondary fuel together pass into the combustion chamber.

The invention may be applied to an internal combustion engine in which a driven part is moved as a result of the combustion of the air and fuel, either of the spark ignition or diesel type. Where the engine is of the spark ignition type, the combustion air may be mixed with fuel upstream of the duct in a carburettor, or the primary fuel is injected directly into the combustion chamber.

Where the engine has a carburettor, the secondary fuel may pass with the primary fuel and the combustion air mixture into the combustion chamber.

Alternatively, where the primary fuel is injected into the combustion chamber, the secondary fuel may be injected with or separately from the primary fuel into the combustion chamber.

Where the secondary fuel is fed into the duct means through which the combustion air passes prior to entering the combustion chamber, the air in the duct means may if desired, be at least partially pre-compressed, or may be at ambient pressure. In the former case, the secondary fuel would need to be positively injected into the duct means; in the latter case, the secondary fuel may be injected into the duct means, or induced therein by the flow of air, as desired.

In the latter case, the quantity of secondary fuel which is induced into the duct means, may be metered.

It has been found that where the secondary fuel comprises a suitable high octane hydrocarbon fuel, such as for example a mineral oil, e.g. paraffin which contains a high proportion of branched chain isomers, the efficiency of the engine is increased significantly compared with a conventional engine. In turn, this increase in efficiency reduces significantly the production of harmful exhaust emissions such as smoke, particulates, carbon monoxide, hydrocarbons and oxides of nitrogen. Where applied to an internal combustion engine and combined with a catalytic converter for example, or other means for cleansing the exhaust emissions from the engine, the emissions which pass into the atmosphere eventually can be rendered virtually harmless.

The housing may be of any desired configuration but preferably is substantially cylindrical, comprising a cylindrical side wall and top and bottom closure plates. Thus the longitudinal axis of the cylinder may extend substantially upright in use, or generally horizontal as desired.

Means may be provided to limit the degree to which the chamber can be filled with liquid secondary fuel such that a space is provided above the liquid into which the secondary fuel in vapour state may pass from the heating device prior to passing out of the housing via the outlet means.

The heating device may be of any desired configuration but preferably is contained within a sheath which may be generally cylindrical. The sheath may be provided anywhere convenient within the housing as desired, but preferably is generally concentric therewith.

The heating device may comprise a heat exchanger into which the liquid secondary fuel passes from the chamber of the housing, and the heating device may include a heating means to provide heat to the heat exchanger such that the secondary fuel is heated therein.

The heat exchanger is preferably insulated from the liquid secondary fuel in the chamber. For example mineral and/or ceramic insulation may be provided between the sheath and the heat exchanger. If desired, prior to passing into the heat exchanger, the secondary fuel, in liquid state, may pass into a jacket surrounding the heating device such that the fuel is preheated.

The heat exchanger may conveniently comprise a coil made for example of stainless steel or brass, and where the heating means is upright, the secondary fuel may enter the coil towards a bottom end of the heating means, and may flow upwardly into the coil as it is heated.

In one arrangement, the heating means comprises an electrical heating element, for example contained within a tube, and the coil or other heat exchanger may be provided around the tube.

Temperature sensing means comprising for example a thermostat, thermistor, thermocouple or positive resistance thermocouple (PRT) sensor may be provided to sense the temperature to which the secondary fuel is heated by the heating means, and to provide a signal to a remote control means which controls the heating effect of the heating means.

In another arrangement, instead of an electrical heating means, another kind of heating means may be provided. For example, heat generated by the internal combustion engine may be harnessed to heat the secondary fuel. It is envisaged that hot exhaust gases may be fed to the heating device and the heat thereof exchanged in the heat exchanger with the secondary fuel.

In this latter case, preferably a control means is provided which includes a valve means to control the amount of the exhaust gases and hence the heat thereof generated by the internal combustion engine, which is fed to the heating device.

In each case, the control means may be adapted to maintain the temperature to which the secondary fluid is heated, to a temperature in the range 310° C. to 450° C. but in any event preferably below 600° C., thus to crack the hydrocarbon based secondary fuel.

A typical housing of a secondary fuel apparatus of an engine in accordance with the invention preferably is, externally, less than 6 inches in length, and preferably less than 3 inches in diameter, and thus has a maximum volume of about 0.7 of a liter.

Preferably, for a larger engine which requires a greater quantity of secondary fuel than can be provided by a secondary fuel apparatus of such small dimensions, rather than scaling up the dimensions of the apparatus, preferably a plurality of smaller dimensioned such apparatus may be provided each feeding secondary fuel in vapour state to the combustion chamber or chambers of the engine, e.g. via a common vapour reservoir.

Alternatively, for a large capacity engine, a plurality of small dimensioned secondary fuel apparatus may each contribute individually, secondary fuel in vapour state, to the engine.

The invention will now be described with reference to the accompanying drawings in which:

FIG. 2 is a side cross sectional view through a secondary fuel apparatus for use in the engine of FIG. 1, FIG. 3 is a plan view of the apparatus of FIG. 2, FIG. 4 is a sectional view on the arrows IV—IV of FIG. 2.

Figure 1:
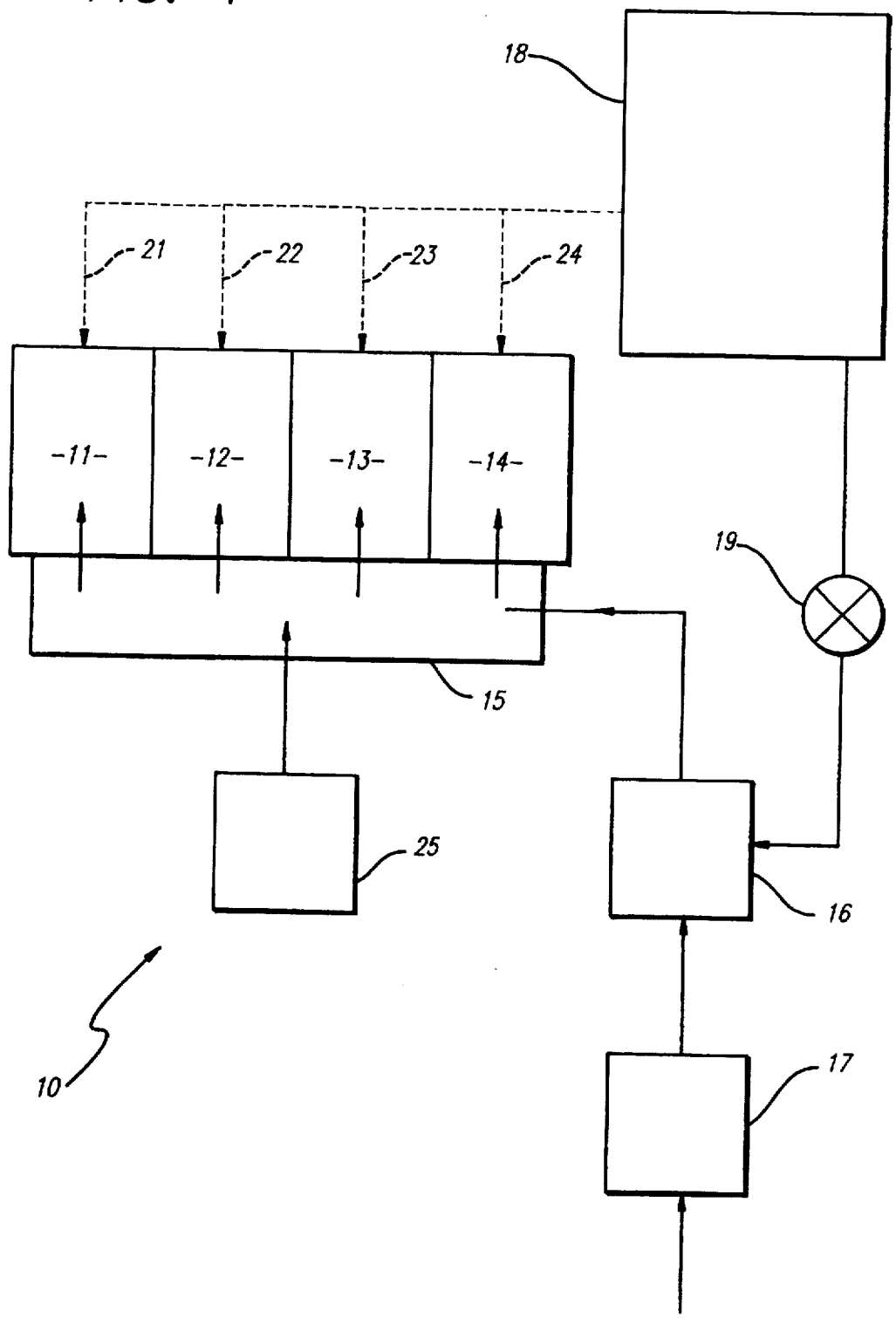
FIG. 1 is a schematic illustration of an internal combustion engine in accordance with the invention.

Referring first to FIG. 1, an internal combustion engine 10 comprises in this example, four combustion chambers 11,12, 13 and 14, each containing a piston which reciprocates in its respective combustion chamber in response to the ignition of a fuel/air mixture under compression.

Air is fed into each of the respective combustion chambers 11–14 via an air inlet manifold 15 to which air is supplied via in this example, a carburetter 16 to which in turn air is supplied from the atmosphere via an air filter 17.

A primary fuel is stored in a tank 18 and is pumped via a pump 19 to the carburetter 16 as is well known in the art, and the fuel and air are mixed together in the carburetter 16 such that an air fuel vapour mixture is fed to the inlet manifold 15.

In an alternative arrangement, where a carburetter 16 is not provided, fuel from the tank 18 may be injected directly into each of the combustion chambers 11–14 when appropriate, via suitable injectors indicated at 21,22,23 and 24 respectively.

In accordance with the present invention, a secondary fuel apparatus 25 is provided to supply secondary fuel to the combustion chambers 11–14, and enhance the efficiency of combustion of the primary fuel therein.

Referring now to FIGS. 2 to 4, the secondary fuel apparatus 25 comprises a housing 26 having a generally cylindrical side wall 27 a top plate 28 and a bottom plate 29, the housing 26 in use being arranged in a substantially upright orientation. If desired, the apparatus 25 may alternatively be arranged such that the housing is in a generally horizontal orientation, or any other suitable orientation.

The housing 26 thus provides within it, a chamber 30 which contains secondary fuel. Secondary fuel may be introduced into the chamber 30 either via a fill hole 31 which extends through the top plate 28 of the apparatus, or via a side fill hole 32.

Arranged concentrically within the housing 26, there is provided a heating device 35 which comprises an outer sheath 36 conveniently of stainless steel or the like, and containing within it a heating means 37. In the example shown in FIG. 2, the heating means 37 comprises an electrical resistance heating element, electrical leads for the element being indicated at 39 and 40, extending out of the housing 26 through an opening in the bottom plate 29, and extending to a remote control means 33.

Surrounding the heating element 37, there is a heat exchanger 42 comprising a coil made of stainless steel or brass.

Secondary fuel may pass from the chamber 30 into the coil 42 at a position 43 towards the bottom end of the heating means 35, by gravity, and flows upwardly through the coil 42 as it is heated by the heating means 37. The fuel is at least vaporised and passes out of the coil 42 at position 44 into a space 45 provided above the maximum fill level of the secondary fuel in the chamber 30. Because it is possible that some unvaporised fuel can pass out of the coil 42 at position 44, a splash plate 49 is provided so that any such liquid fuel will impinge upon the plate 49 and fall downwardly back into the chamber 30. The secondary fuel in vapour state however can pass out of the housing 26 via an outlet 46 which is connected via suitable pipework or tubing (not shown) to the inlet manifold 15 of the internal combustion engine 12. In a preferred arrangement, the housing 26 is in thermal contact with a hot part of the engine, such as an exhaust manifold thereof, so that the secondary fuel in chamber 30, is warmed.

Between the sheath 36 and the coil 42 of the heating means 35, mineral and/or ceramic insulation is provided as indicated at 47 to restrict the amount of heat loss from the coil 42 to the liquid secondary fuel contained within chamber 30. The insulation 47, where ceramic, may comprise a cast block, or ceramic beads for examples.

Figure 6:
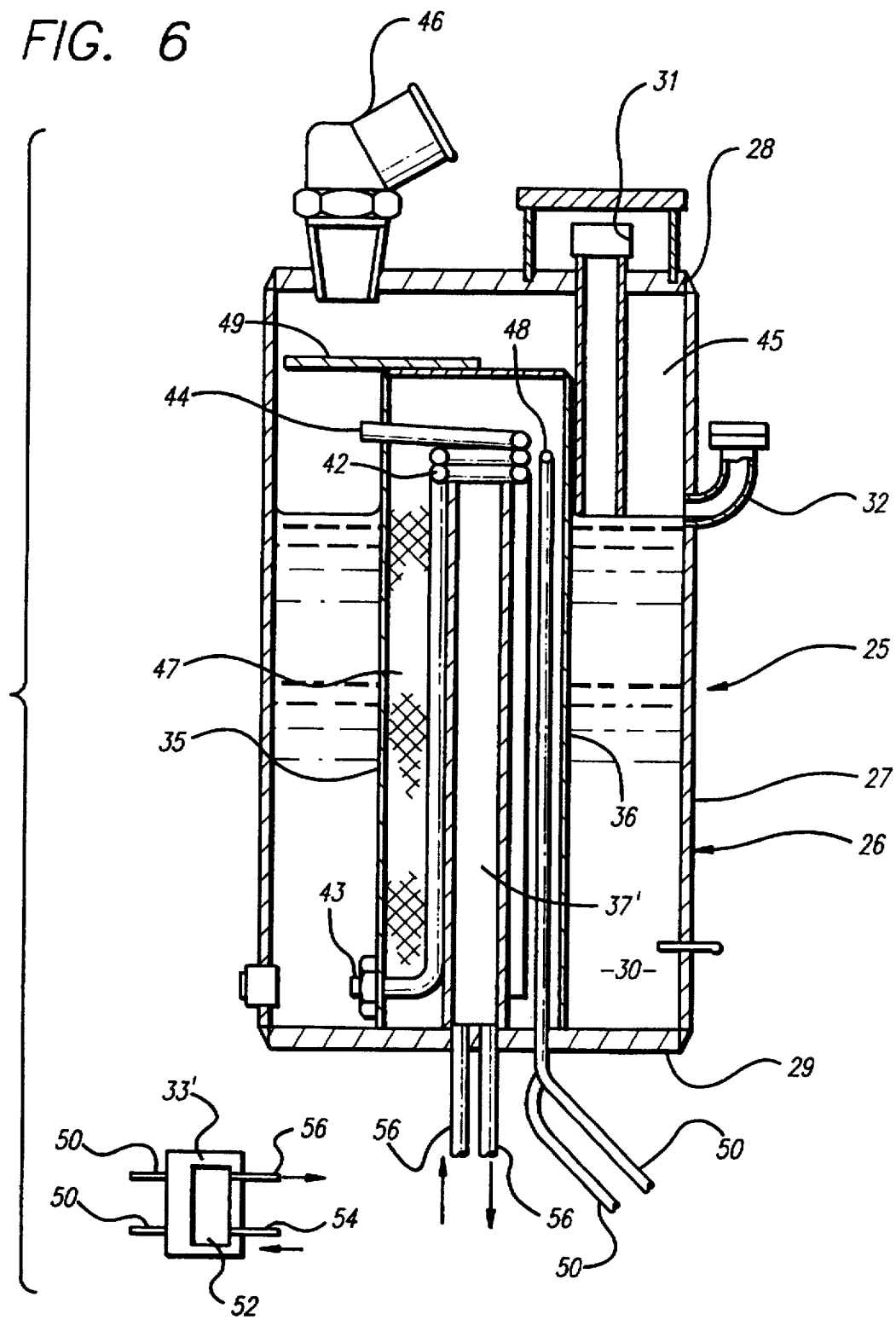
FIG. 6 is a cross-sectional view of another alternate embodiment of a secondary fuel apparatus for use in the engine of FIG. 1.

Alternatively, or additionally, as is illustrated in FIG. 6, a jacket 38 may be provided around coil 42, e.g. by means of a second concentric sheath, and the secondary fuel may be constrained to flow in liquid state into the jacket prior to passing into coil 42, such that the secondary fuel is preheated in the jacket.

In each case, between the coil 42 and the sheath 36, there is provided a temperature sensing means 48 comprising in this example a thermocouple, electrical leads indicated at 50 extending from the thermocouple 48, through a suitable opening in the bottom plate 29 of the housing 26 to the remote control means 33.

In use, as the engine 10 runs, electrical current is supplied to the heating element 37 of the heating device 35 such that secondary fuel in the coil 42 is heated to a temperature of above 310° C., and below 600° C., preferably below 450° C. The secondary fuel in the coil 42 is thus cracked so that vapours containing methane, ethylene, and propylene, along with other hydrocarbon gases such as butane and butalene etc. are produced. One suitable kind of secondary fuel is paraffin, although another mineral oil or even a processed vegetable oil or a mixture of these may be used if desired. In each case, the secondary fuel in the chamber 30 is different from the primary fuel in the tank 18, and is preferably of a greater octane rating.

Thus the efficiency with which the primary fuel is burned in the combustion chambers 11–14, is enhanced and this has the effect of reducing the production of harmful exhaust emissions.

In the arrangement shown in FIGS. 2–4, the apparatus 25 has an overall length of about 4 inches, and a diameter of about 2 inches, such that the maximum capacity of the chamber 30 is less than a quarter of a liter. Hence the apparatus 25 does not take up any significant space in the engine compartment of a motor vehicle for example in which the internal combustion engine 10 may be provided.

By providing sufficiently efficient insulation 47 between the sheath 36 and the heat exchanger 42 and ensuring that the coil 42 is made of a sufficiently high conductivity metal, the power consumption of the electrical heating element 37 can be kept to an absolute minimum. In trials, the continuous electrical load has been measured at only 1.5 amps.

If desired, the apparatus may be controlled so as to operate only intermittently. This works because it has been found that use of the apparatus 25 described to produce secondary fuel in vapour state which is fed into the engine has a residual effect i.e. the benefits mentioned above continue for a time even when no secondary fuel is being fed into the combustion chamber or chambers.

Various modifications are possible without departing from the scope of the invention. For example, the housing 26 need not be of the cylindrical configuration described, and nor need the heating device 35 be provided within the cylindrical sheath 36 concentrically within the housing 26. A housing 26 and a heating device 35 of alternate configurations may be provided. For example, the heating device 35 may be provided adjacent the cylindrical side wall 27 of the housing 26.

It is envisaged that the housing 26 may be made as an integral part of an engine casting, or of another part of the engine which becomes hot in use, so that the secondary fuel in the chamber 30 is warmed in the chamber 30.

Although the heat exchanger through which the secondary fuel flows while it is heated is described above as a coil 42, a heat exchanger of another suitable configuration may instead be provided.

If desired, secondary fuel in liquid state may be stored externally of the chamber 30 and fed to the chamber 30 by a pump or under gravity such that the fill level of the secondary fuel in chamber 30 is maintained constant.

Instead of a thermocouple 48, any other temperature sensing means such as a thermostat, thermistor or PRT sensor could be provided.

Instead of a heating element 37, the heat generated by the internal combustion engine 10 may be harnessed to heat the secondary fuel in the heating device 35. For example, a proportion of the hot exhaust gases produced by the engine may be fed to the heating device 35 such that the heat thereof is given up to the secondary fuel within the coil 42 or other heat exchanger.

In each case, preferably a control means 33 is provided to control the temperature to which the secondary fuel is heated.

Where the heating means comprises an electrical heating element 37, the control means 33 may include a relay or other circuit interrupter, which responds to the temperature sensed by the temperature sensor 48, to cut off the supply of electrical current to the heating element 37 when the temperature sensor 48 senses a maximum temperature.

Where hot exhaust gases for example are fed to the heating device 35, as is illustrated in FIG. 6, the control means 33' may include a valve means 52 which is opened or closed to emit or restrict the flow of exhaust gases through line 54 via line 56 to the heating means 37' which in turn thus controls the temperature to which the secondary fuel is heated. The control means may additionally or alternatively control the quantity of liquid secondary fuel fed to the heating device 35, to ensure adequate heating to cause cracking of the secondary fuel.

The apparatus 25 described with reference to FIGS. 2 to 4, is sized ideally for an average family sized motor car having a total engine capacity of, say, up to 2 liters. For larger capacity engines, such as engines which are used industrially in lorries or the like, the dimensions of the apparatus 25 could be scaled up. Preferably though, a plurality of smaller dimensions of such apparatus 25 are provided to enable a sufficient quantity of cracked secondary fuel to be supplied to the combustion chambers of the engine. Such plurality of apparatus may each contribute secondary fuel in a vapour state to the engine, directly or via a common reservoir of vapours.

Although the invention has been described with reference to an internal combustion engine comprising four combustion chambers, the invention may be applied to an internal combustion engine having any number of combustion chambers.

Whereas the invention has been described with reference to an internal combustion engine having combustion chambers in which there is a piston which reciprocates, the invention may be applied to an engine in which the piston or other driven part is rotatable or otherwise movable in response to the ignition of fuel/air mixture in the combustion chamber. The invention may even be applied to a jet or rocket engine.

In the arrangement described in FIG. 1, the air which is fed into the inlet manifold 15 is at ambient pressure, or only a slightly raised pressure compared with atmosphere, whereas if desired, the air could be at least partially compressed before entering the or an appropriate combustion chamber. In this latter event, it may be necessary to provide some means to pump the cracked secondary fuel in vapour state to the inlet manifold 15.

In yet another arrangement, instead of feeding the cracked secondary fuel in vapour state to the inlet manifold 15, this may be injected directly into the combustion chamber or chambers of the engine along with or separately from the primary fuel.

What is claimed is:

1. An engine comprising at least one combustion chamber in which fuel and air are ignited to produce power, delivery means to deliver the primary fuel to the combustion chamber, air delivery means to provide air to the combustion chamber and including delivery duct means through which the air flows prior to entering the combustion chamber, an apparatus to provide a secondary fuel to the combustion chamber, the secondary fuel being different from the primary fuel, characterized in that the apparatus which provides the secondary fuel to the combustion chamber comprises a housing having therein:
   (a) a chamber in which the secondary fuel is stored in liquid state, and,
   (b) a heating device into which liquid fuel may flow from the chamber, the heating device being adapted to heat the secondary fuel sufficiently to cause at least vaporization thereof, the heating device being contained within a sheath which is generally cylindrical and generally concentric with the housing, the heating device including a heat exchanger into which the liquid secondary fuel passes from the chamber of the housing and a heating means to provide heat to the heat exchanger such that the secondary fuel is heated therein, the heat exchanger being insulated from the liquid secondary fuel in the chamber by insulation provided between the sheath and the heat exchanger and prior to passing into the heat exchanger, the secondary fuel, in liquid state, passes into a jacket surrounding the heating device such that the fuel is preheated, and the housing having outlet means from which the secondary fuel can pass in vapor state and there being passage means along which the secondary fuel flow towards the combustion chamber.

2. An engine according to claim 1 characterized in that the heating means comprises an electrical heating element and temperature sensing means are provided to sense the temperature to which the secondary fuel is heated by the heating element, and to provide a signal to a remote control means which controls the heating effect of the heating element.

3. An engine according to claim 1 characterized in that heat generated by the internal combustion engine is harnessed to heat the secondary fuel, wherein hot exhaust gases are fed to the heating device and the heat thereof exchanged in the heat exchanger with the secondary fuel, and a control means is provided which includes a valve means to control the amount of the exhaust gases and hence the heat thereof generated by the internal combustion engine, which is fed to the heating device, the control means being adapted to maintain the temperature to which the secondary fluid is heated, to a temperature in the range 310° C. to 450° C. to crack the hydrocarbon based secondary fuel.

4. An improvement for an engine comprising at least one combustion chamber in which fuel and air are ignited to produce power, delivery means to deliver a primary fuel to the combustion chamber, air delivery means to provide air to the combustion chamber and including delivery duct means through which the air flows prior to entering the combustion chamber, an apparatus to provide a secondary fuel to the combustion chamber, the secondary fuel being different from the primary fuel wherein the apparatus which provides the secondary fuel to the combustion chamber comprises a housing having therein (a) a chamber in which the secondary fuel is stored in liquid state, and (b) a heating device into which liquid secondary fuel may flow from the chamber, the heating device being adapted to heat the secondary fuel sufficiently to cause at least vaporization thereof, the housing having outlet means from which the secondary fuel can pass in a vapor state, and there being passage means along which the secondary fuel flows towards the combustion chamber, the improvement comprising:

means for limiting the degree to which the chamber can be filled with liquid secondary fuel such that the space is provided above the liquid into which the secondary fuel in a vapor state may pass from the heating device prior to passing out of the housing via the outlet means, and the heating device being contained within a sheath which is located within the housing, the heating devices including a heat exchanger into which the liquid secondary fuel passes from the chamber of the housing and a heating means to provide heat to the heat exchanger such that the secondary fuel is heated therein.

5. An engine according to claim 4, wherein the heat exchanger is insulated from the liquid secondary fuel in the chamber by insulation provided between the sheath and the heat exchanger.

6. An engine according to claim 4, wherein prior to passing into the heat exchanger, the secondary fuel, in a liquid state, passes into a jacket surrounding the heating device such that the secondary fuel is preheated.

7. An engine according to claim 5, wherein prior to passing into the heat exchanger, the secondary fuel, in a liquid state, passes into a jacket surrounding the heating device such that the secondary fuel is preheated.

8. An engine according to claim 4, wherein the housing is substantially cylindrical, the housing comprising a cylindrical side wall and top and bottom closure plates, the sheath being generally cylindrical and generally concentric with the housing.

9. An engine according to claim 4, wherein the heating means comprises an electrical heating element and temperature sensing means are provided to sense the temperature to which the secondary fuel is heated by the heating element, said temperature sensing means providing a signal to remote control means which controls the heating effect of the heating element.

10. An engine according to claim 4, wherein heat generated by the engine is harnessed to heat the secondary fuel, hot exhaust gases are fed to the heating device and the heat thereof exchanged in the heat exchanger with the secondary fuel, and a control means is provided which includes a valve means to control the combustion engine, which is fed to the heating device.

11. An engine according to claim 9, wherein the control means is adapted to maintain the temperature to which the secondary fuel is heated, to a temperature in the range of 310° C. to 450° C. to crack the secondary fuel.

12. An engine according to claim 10, wherein the control means is adapted to maintain the temperature to which the secondary fuel is heated, to a temperature in the range of 310° C. to 450° C. to crack the secondary fuel.

13. An engine according to claim 11, wherein the secondary fuel is hydrocarbon based.

14. An engine according to claim 12, wherein the secondary fuel is hydrocarbon based.

15. An engine according to claim 4, comprising a plurality of the secondary fuel apparatus, each secondary fuel apparatus feeding secondary fuel in a vapor state to said at least one combustion chamber of the engine.

* * * * *

UNITED STATES PATENT AND TRADEMARK OFFICE
CERTIFICATE OF CORRECTION

PATENT NO.  : 5,775,308
DATED       : Jul. 7, 1998
INVENTOR(S) : Ronald George Alfonso Headley It is certified that error appears in the above-identified patent and that said Letters Patent is hereby corrected as shown below:

Column 3, line 39, change "2.", to read --2,--.

Figure 5:
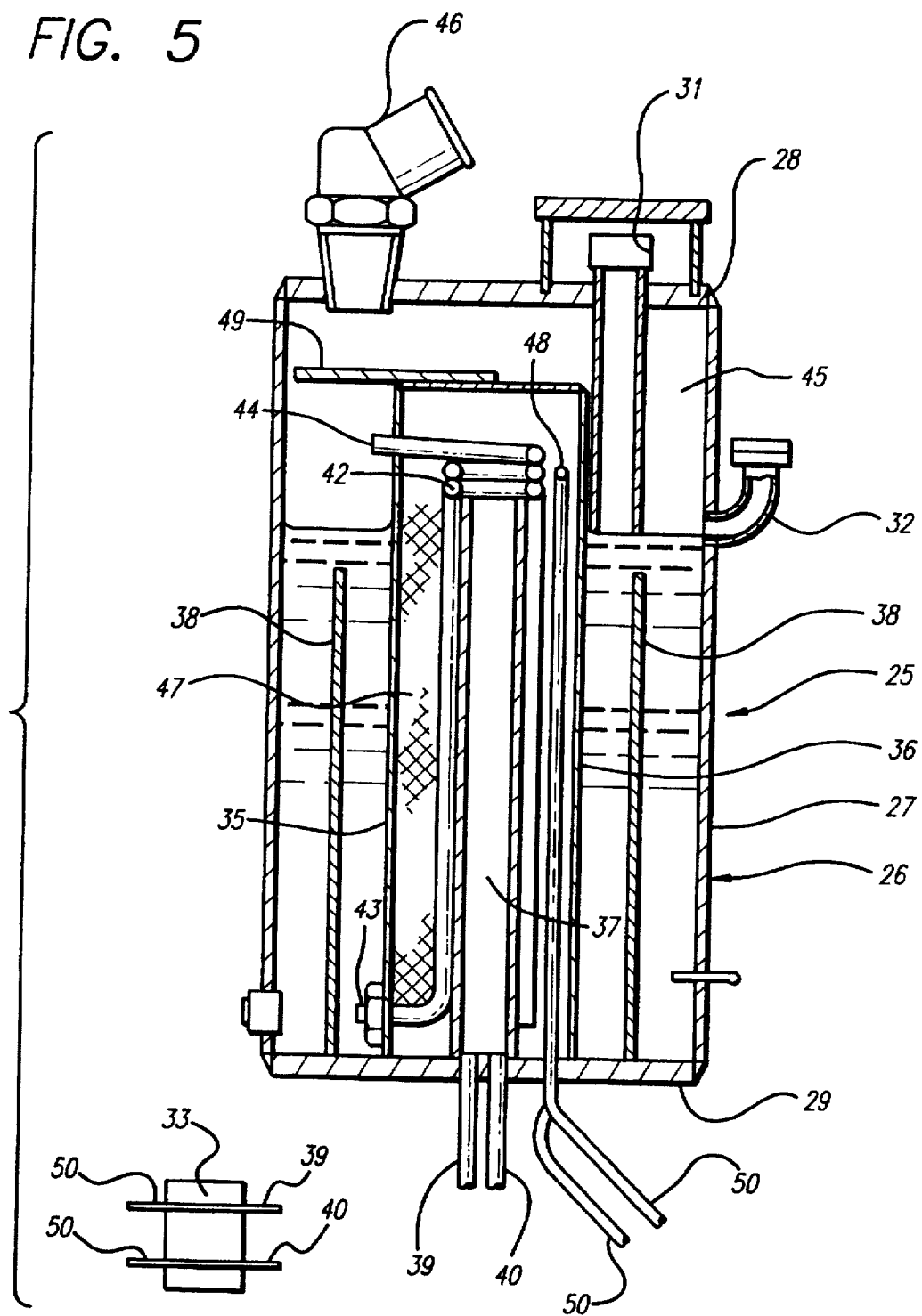
FIG. 5 is a cross-sectional view of an alternate embodiment of a secondary fuel apparatus for use in the engine of FIG. 1.

Column 4, line 49, change "FIG. 6", to read --FIG. 5--.

Signed and Sealed this

Fifth Day of January, 1999

Attest:

*Attesting Officer*           *Acting Commissioner of Patents and Trademarks*